(12) United States Patent
Jones et al.

(10) Patent No.: US 9,171,398 B2
(45) Date of Patent: Oct. 27, 2015

(54) RENDERING CAUSTICS IN COMPUTER GRAPHICS WITH PHOTON MAPPING BY RELAXATION

(75) Inventors: Mark Jones, Swansea (GB); Ben Spencer, London (GB)

(73) Assignee: UWS Ventures Ltd., Swansea (GB)

( * ) Notice: Subject to any disclaimer, the term of this patent is extended or adjusted under 35 U.S.C. 154(b) by 440 days.

(21) Appl. No.: 13/202,015

(22) PCT Filed: Feb. 17, 2010

(86) PCT No.: PCT/EP2010/051998
§ 371 (c)(1),
(2), (4) Date: Oct. 31, 2011

(87) PCT Pub. No.: WO2010/094713
PCT Pub. Date: Aug. 26, 2010

(65) Prior Publication Data
US 2012/0038644 A1 Feb. 16, 2012

(30) Foreign Application Priority Data
Feb. 18, 2009 (GB) .................................. 0902681.6

(51) Int. Cl.
*G06T 15/50* (2011.01)
*G06T 15/06* (2011.01)

(52) U.S. Cl.
CPC .............. *G06T 15/506* (2013.01); *G06T 15/06* (2013.01)

(58) Field of Classification Search
USPC ........................................................ 345/426
See application file for complete search history.

(56) References Cited

U.S. PATENT DOCUMENTS

2008/0143720 A1\* 6/2008 Elmquist ...................... 345/426
2009/0147002 A1\* 6/2009 Keller ........................... 345/426
2010/0079452 A1\* 4/2010 Zhou et al. .................... 345/420

OTHER PUBLICATIONS

A. Keller, "A Quasi-Monte Carlo Algorithm for the Global Illumination Problem in the Radiosity Setting" (1995).
H. Jenson and J. Buhler, "A Rapid Hierarchical Rendering Technique for Translucent Materials," SIGGRAPH '02 Proceedings of the 29th annual conference on Computer graphics and interactive techniques (2002).
S. Collins, "Adaptive Splatting for Specular to Diffuse Light Transport," (1994).
H. Hey and W. Purgathofer, "Advanced Radiance Estimation for Photon Map Global Illumination," Eurographics 2002.
Dippé et al., "Antialiasing Through Stochastic Sampling," S I G G R A P H '85 vol. 19, No. 3,1985.
R. Cook, "Stochastic Sampling in Computer Graphics," ACM Transactions on Graphics, vol. 5, No. 1, Jan. 1986, pp. 51-72.
B. Walter, "Density Estimation Techniques for Global Illumination," Cornell University (1998).

(Continued)

*Primary Examiner* — David Zarka
*Assistant Examiner* — Richard M Russell
(74) *Attorney, Agent, or Firm* — 24IP Law Group; Timothy R DeWitt

(57) ABSTRACT

The invention relates to a method of rendering caustics in a computer graphics scene. The method comprises obtaining a photon map of said scene, redistributing photons from said photon map into an arrangement with a blue noise spectral signature by performing a relaxation step in respect of each of a number of photons, determining a constraining vector for each of a number of photons and rendering said scene using results from the redistributing photons and/or from determining a constraining vector.

6 Claims, 6 Drawing Sheets

(56) References Cited

OTHER PUBLICATIONS

P. Shirley, "Discrepancy as a Quality Measure for Sample Distributions," Proceedings of Eurographics 91, Jun. 1991, pp. 183-193.
R. Ulichney, "Dithering with blue noise," Proceedings of the IEEE, vol. 76, No. 1, Jan. 1988.
Walter, et al., "Global Illumination Using Local Linear Density Estimation," ACM Transactions on Graphics (TOG) vol. 16 Issue 3, Jul. 1997.
H. Jensen, "Global illumination using photon maps," Rendering Techniques '96 (Proceedings of the Seventh Eurographics Workshop on Rendering), pp. 21{30, 1996.
Shirley et al., "Global illumination via density estimation," Proceedings of 6th Workshop on Rendering (Dublin, Ireland) 1995.
H. Faure, "Good permutations for extreme discrepancy," Journal of Number Theory 42, 47-56 (1992).
B. Spencer and M. Jones, "Hierarchical photon mapping," IEEE Transactions on Visualization and Computer Graphics, vol. 15, No. 1, Jan./Feb. 2009.
K. Myszkowski, "Lighting Reconstruction Using Fast and Adaptive Density Estimation Techniques," Proceedings of the Eurographics Workshop on Rendering Techniques '97 (1997).
E. Reinhard, M. Stark, P. Shirley and J. Ferwerda, 'Photographic Tone Reproduction for Digital Images', ACM Transactions on Graphics, 21(3), Jul. 2002 (Proceedings of SIGGRAPH 2002).
H. Jensen and N. Christensen, "Photon maps in bidirectional Monte Carlo ray tracing of complex objects," Computers & Graphics vol. 19, Issue 2, Mar.-Apr. 1995, pp. 215-224.
Lars Schjøth, Jeppe Revall Frisvad, Kenny Erleben and Jon Sporring, "Photon Differentials," GRAPHITE '07 Proceedings of the 5th international conference on Computer graphics and interactive techniques in Australia and Southeast Asia (2007).
Kopf et al., "Recursive Wang Tiles for Real-Time Blue Noise," ACM Transactions on Graphics (TOG)—Proceedings of ACM SIGGRAPH 2006, vol. 25 Issue 3, Jul. 2006.
G. Turk, "Re-tiling polygonal surfaces," Computer Graphics, vol. 26, No. 2 ( Jul. 1992): (SIGGRAPH 92 Conference Proceedings): pp. 55-64.
H. Igehy, "Tracing Ray Differentials," SIGGRAPH '99 Proceedings of the 26th annual conference on Computer graphics and interactive techniques (1999).
Schregle R., "Bias compensation for photon maps," Computer Graphics, vol. 22 (2003), No. 4, pp. 729-742.
Jensen H., "A practical guide to global illumination using ray tracing and photon mapping," Siggraph 2002 Course 19.
McCool, M., "Hierarchical Poisson Disk Sampling Distributions," Graphics Interface '92 (1992).
V. Ostromoukhov, C. Donohue, P. Jodoin, "Fast hierarchical importance sampling with blue noise properties," (2004).
S. Hiller, O. Deussen and A. Keller, "Tiled blue noise samples," VMV 2001.
L. Schjoth, J. Sporring and O. Olsen, "Diffusion based photon mapping," Computer Graphics, vol. 27 (2008), No. 8 pp. 2114-2127.
G. Turk, "Generating textures on arbitrary surfaces using reaction-diffusion," Computer Graphics, vol. 25, No. 4, Jul. 1991 pp. 289-298.
B. Spencer and M. Jones, "Better caustics through photon relaxation," Eurograhics 2009, vol. 28, No. 2.

* cited by examiner

RENDERING CAUSTICS IN COMPUTER GRAPHICS WITH PHOTON MAPPING BY RELAXATION

This invention relates generally to rendering caustics in computer graphics and, more particularly, to a method and system for rendering caustics in which render time is optimised, topology, proximity and boundary bias are all minimised and edges and discontinuities are effectively preserved.

It is a constant objective, in field of generation of computer graphics scenes, to accurately approximate lighting phenomenon so as to make the viewing experience in respect of such scenes as realistic as possible. The intricate play between lights and the 3D surfaces in a scene is a computationally intensive process, and practically, the lighting process needs to be efficient while maintaining an acceptable depiction of the interaction between light and the 3D surfaces.

Caustics are an indirect lighting phenomenon that adds realism to a scene. In terms of rendering a computer graphics scene, caustics are an addition thereto that calculates photons of light starting at the light source (like real light), which can be reflected, refracted, bounced off mirrors, or concentrated by a lens, accurately simulating more of the ways real light can move through a scene.

Photon mapping remains one of the most effective methods for synthesizing and rendering realistic caustics. In computer graphics, photon mapping is a two-pass global illumination algorithm that solves the so-called rendering equation (defined as an integral equation in which the equilibrium radiance leaving a point is given as the sum of emitted plus reflected radiance under a geometric optics approximation, and which equation various realistic techniques in computer graphics attempt to solve).

In photon mapping, rays from the light source and rays from the camera are traced independently until some termination criterion is met, and then they are connected in a second step to produce a radiance value. It is used to realistically simulate the interaction of light with different objects. Specifically, it is capable of simulating the refraction of light through a transparent substance such as glass or water, diffuse interreflection between illuminated objects, the subsurface scattering of light in translucent materials, and some of the effects caused by particulate matter such as smoke or water vapour.

Returning to the concept of caustics, a caustic is a pattern of light that is focused on a surface after having the original path of light rays bent by an intermediate surface (either by refraction or reflection). The reason that photon mapping remains one of the most effective methods of synthesis in and rendering realistic caustics is that the decoupling of radiant flux from scene geometry makes the technique highly suited to computing illumination over a variety of surfaces and BRDFs (Bidirectional Reflectance Distribution Functions). In addition, view-independence and temporal coherency makes it ideal for animation.

By far the most successful method of computing incident radiance form the photon map has been that of k-nearest neighbor (k-NN) density estimation. As will be known to a person skilled in the art, the photon map stores light articles in a so-called kd-tree and density estimation can be performed on the fly during rendering by querying the k nearest neighboring photons. As the kd-query is independent of scene geometry, photons mapping does not suffer from meshing artefacts and can efficiently be used for highly complex scenes. When non-polygonal scenes, such as fractal surfaces and volumetric effects can, therefore be handled well through photons mapping, using k-NN density estimation.

However, in order to be effective, this approach requires earful tuning so as to minimise the effects of signal noise and bias. As the most fundamental level, noise and bias are opposing quantities on a continuum defined by kernel bandwidth. By increasing the bandwidth, high frequency components of the signal are filtered out while error in the form of bias is introduced. For both relatively high and relatively low bandwidth, visually objectionable artefacts begin to appear, evident as bias and high-frequency noise respectively.

In order to reduce errors in the radiance estimate, a large body of prior research has focused on optimal bandwidth reflection and kernel filtering. Broadly stated, the problem is one of signal noise reduction, and is well known throughout computer science and engineering. Many methods rely on adapting the size and shape of the kernel so as to achieve better results.

The naïve approach to k-nearest neighbor (k-NN) density estimation involves solving the problem for a given point within the photon map. The irradiance at point x can be surmised as the sum of the power of the k nearest photons to x, divided by the area of the disc enclosing the points. Since the introduction of photon density estimation in global illumination, expansions to the algorithm have largely been divided between two categories; selecting an optimum kernel bandwidth and photon weighting and filtering.

BACKGROUND TO THE INVENTION

Jensen (JC95) proposed differential checking as a method of selecting an optimal bandwidth. Given as initial estimate, the search radiance is expanded incrementally by adding progressively more neighbouring photons. If the irradiance differential between the estimates exceeds some given threshold then the search is halted. This approach maximises the search radius and hence minimises noise, while at the same time avoiding penalties from bias.

Schregle (Sch03) proposed a bias compensation operator by using a binary search to hone in upon the optimal bandwidth. An estimate of the expected value of the combined bias and variance for the current bandwidth is calculated, and the variance contribution is differentiated from the bias by using knowledge that it matches a Gaussian distribution. This bias estimate can govern the binary search, and thus the optimum bandwidth can be discovered. The method is effective; adapting bandwidth across an image in order to preserve both peak irradiance and sharp edges in irradiance, at the same time allowing higher bandwidths, and therefore reduced variance, in smoothly varying regions.

Hey et al. (HP02) approach the problems of boundary and topological bias by using the underlying model geometry. During radiance estimation, polygons in the nearest neighbourhood to the sample position are determined, their area is calculated and photon power is distributed according to their incoming direction. Although very effective, Hey's method is restrictive in that it extensively refers to the polygonal mesh which defines each surface.

Spencer et al (SJ08) use a hierarchical data structure to cluster photon flux data, thus allowing estimate areas of an arbitrary size at a near-constant query cost. Relative photon density per unit area is adjusted by controlling the depth to which the balanced Kd-tree is traversed. A useful side-effect of this approach is that of better photon stratification at shallower cut-off depths. The result is that noise is rapidly reduced as the kernel radius is increased.

The problem of optimal sampling within a given domain is of great significance in many areas of computer graphics. Monte Carlo integration, dithering, importance sampling and a host of other techniques all benefit from well contrived sample distributions. Integrators which rely upon purely random functions to generate samples are known to converge more slowly than those which employ stratified or quasi-random methods. The quality of a sample set is sometimes measured by its discrepancy (Shi91) or the measure of equidistribution between points. Another useful tool for determining distribution quality is a set of points with a radially averaged power spectrum with a blue noise signature and low angular anisotropy are most suitable for convolution operations such as anti-aliasing (see (DW85,Coo86).

Optimal distributions are highly favourable in photon mapping since low photon discrepancy intrinsically means less noise in the radiance estimate. Jensen (JC95) proposed stratifying the photons as they are emitted. This can be accomplished by jittering, n-rooks, Poisson-disk and other sample schemes. Alternatively, a quasi-random sequence [KIAK95] produces well-ordered sets with the added property of good stratification across multiple dimensions.

The concept of diffusing a poorly-distributed point set into a more optimal configuration has been successfully adapted to solve many problems. McCool and Fiume (MF92) used Lloyd's method (Lio83) to generate correctly-spaced Poisson-disk samples. Ostromoukhov et al (ODJ04) also employed Lloyd's method to improve the spatial distribution of samples generated using a hierarchical method based on Penrose tiling. Kopf et al (KCODL06) used a similar scheme to enforce subdivision rules when generating blue noise.

Myszkowski (Mys97) introduced a bias-reduction strategy for the kernel-based density estimation framework established by Shirley et al (SWH*95). Myszkowski proposed an enhanced nearest-neighbour (ENN) method guided by a statistical bias-error metric. By calculating the error from an array of density estimates adjacent to the sample point, the ENN algorithm reduces bias by minimisation across the domain of sample radii.

Walter et al (WHSG97) addressed the issue of bias within the density estimation framework using polynomial regression. Given that boundary bias is also an issue with regression techniques, Walter used a locally-weighted, least squares variant augmented with a complex system to handle boundary regions. Introduced in the paper and further elaborated upon in his PhD thesis (Wal98), Walter also proposed a perceptually-driven bandwidth selector that chooses kernel sizes based upon the limits of visually objectionable noise.

A second class of bias-reduction algorithms focuses on adapting the filter support for the kernel to help reduce unwanted blurring. Isotropic kernels are used in both k-NN- and kernel based methods of density estimation as well as with techniques based on splatting (Col94). Jensen (Jen96b) first integrated the concept into the photon mapping paradigm primarily as a means of reducing proximity bias in caustics.

Later, Schjøth et al (SOS06) introduced a technique based around anisotropic diffusion filtering. Using a structure tensor derived from the photon distribution, they are able to define a shape-adapting kernel aligned to important visual details such as boundaries and discontinuities. The results are shown to be superior to isotropic kernels at the expense of a small precomputation and rendering overhead.

More recently, Schjoth et al (SFES07) proposed adapting ray differential tracing (ige99) to guide the shape of the density estimation kernel. At render time, ray differential information is used to create a unique kernel based upon the shape of the footprints of the photons within the gather radius. This approach is especially effective at rendering high frequency caustics. The authors also demonstrate the power of the technique in realising fine details using only a small number of photons.

Turk (Tur91) introduced a relaxation technique based on point repulsion to facilitate organic texture synthesis. This idea was later elaborated to define a method for re-tiling polygonal surfaces at arbitrary levels of detail (Tur92). More recently, Jensen (JB02) utilised the same concept to ensure equidistribution of irradiance samples around a polygon mesh.

It is an object of the present invention to provide a method and system for synthesising and rendering realistic caustics in which render time improved relative to the prior art, topology, proximity and boundary bias are all minimised, and edges and discontinuities are effectively preserved.

In accordance with the present invention, there is provided A method of rendering caustics in a computer graphics scene, the method comprising:
　(a) Obtaining a photon map of said scene;
　(b) Redistributing photons from said photon map into an arrangement with a blue noise setral signature by performing a relaxation step in respect of each of a number of photons;
　(c) Determining a constraining vector for each of a number of photons; and
　(d) Rendering said scene using the results for step (b) and/or step (c).

Thus, the present invention provides a novel approach to noise and bias reduction upon reconfiguration of the photon map and a novel heuristic to rapidly identify and preserve edges and discontinuities. This approach relaxes the photons onto a configuration with a blue noise spectral signature. This allows for the use of compact kernels with only tens of nearest-neighbours (k-NN). In addition we apply a heuristic in order to preserve important features within the map. This dual strategy has several important advantages, including:
　A blue noise distribution yields high-quality radiance estimates with very few photons. This greatly improves render time (by an average factor of 5 at least) and offsets the precomputation required to relax the distribution.
　Topology, proximity, and boundary bias are all minimised by the compact kernel size.
　Edges and discontinuities are effectively preserved using photon migration constraints.

In a preferred embodiment, in order to redistribute photons over a desired surface of intersecting geometry, a point repulsion method may be used in step (b), whereby for each of a number of photons, at point x, a force of repulsion f is calculated as being the weighted sum of the offset k-nearest neighbours. In one exemplary embodiment, K=6, such that the relaxation step results in the points being relaxed converging to an ideal distribution, namely a hexagonal lattice with 6 adjacent neighbours per point.

For each point, is local density is beneficially determined based upon the weighted average densities stored at the surrounding K photons, the local density being derived from the proximity of the k-nearest neighbours.

The relaxation step preferably includes a diffusion operation applied to the flux of each of the number of photons.

The present invention extends to a computer-implemented system configured to perform the method defined above.

These and other aspects of the invention will be apparent from, and elucidated with reference to the embodiment described herein.

An embodiment of the present invention will now be described by way of example only and with reference to the accompanying drawings, wherein FIG. 1 shows a caustic from a red camera lens filter projected onto a textbook. Upper frame: using an unrelaxed photon map rendered with 200 photons in the radiance estimate. Lower frame: relaxed by 20 iterations and rendered with 20 photons in the radiance estimate. Image inspired by Yusuke Okaue.

FIG. 2 shows a comparison of edge detection methods. Left: using a gradient-based edge detection algorithm (note that a structure tensor-based variant would correct the unwanted diffusion in the right-most vertical bar). Right: our heuristic based approach.

Figure 5:
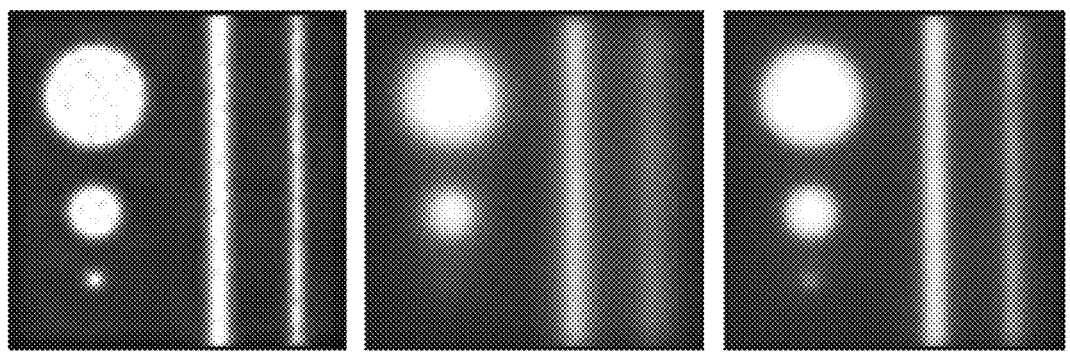

FIG. 5 shows diffusion bias: Left: unrelaxed test pattern rendered with 200 photons in the radiance estimate. Centre: relaxed by 30 iterations without diffusion limiting. Right: relaxed by 30 iterations with diffusion limiting. Note that the constraining vectors defined 25 in section 3.2 are not applied in these examples.

Figure 6:
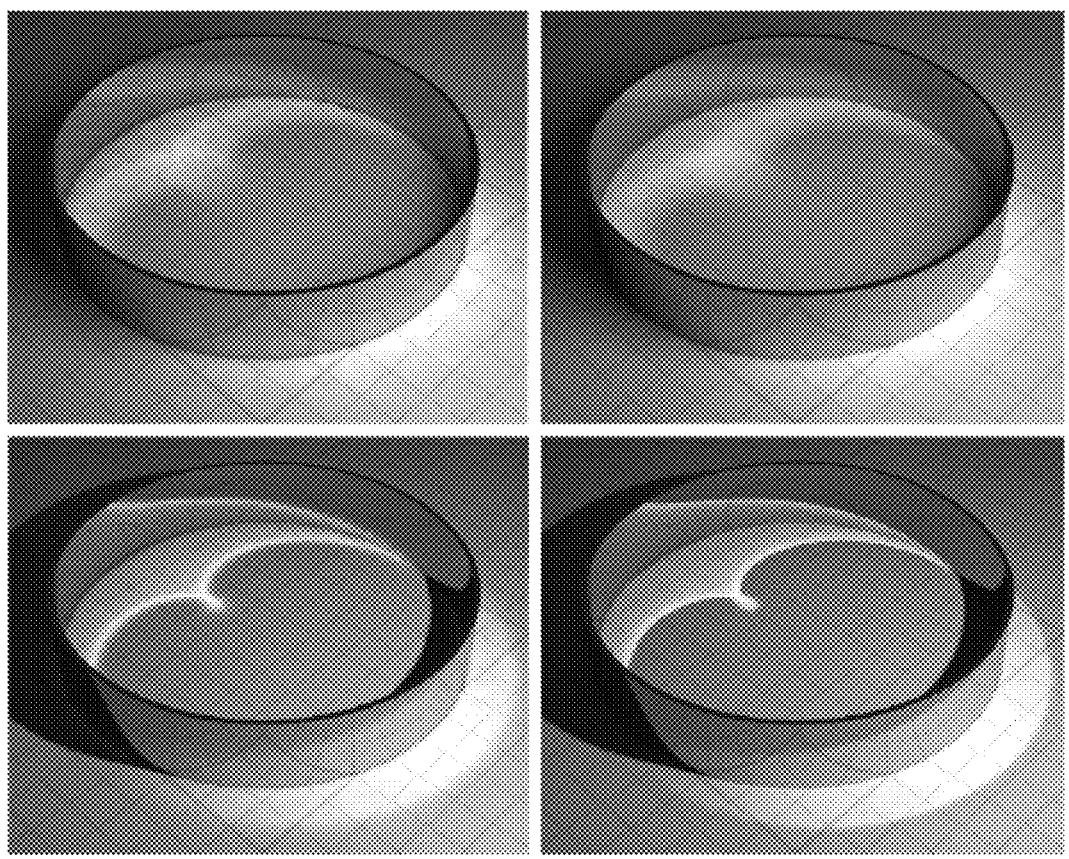

FIG. 6 shows a cardioid caustic from a coloured metal ring. Upper and lower left: unrelaxed photon maps rendered with 100 photons in the radiance estimate. Upper and lower right: relaxed by 20 iterations and rendered with 20 photons in the radiance estimate. Upper left and right: low-frequency caustics from a large area light. Lower left and right: high frequency caustics from a point light.

Figure 7:
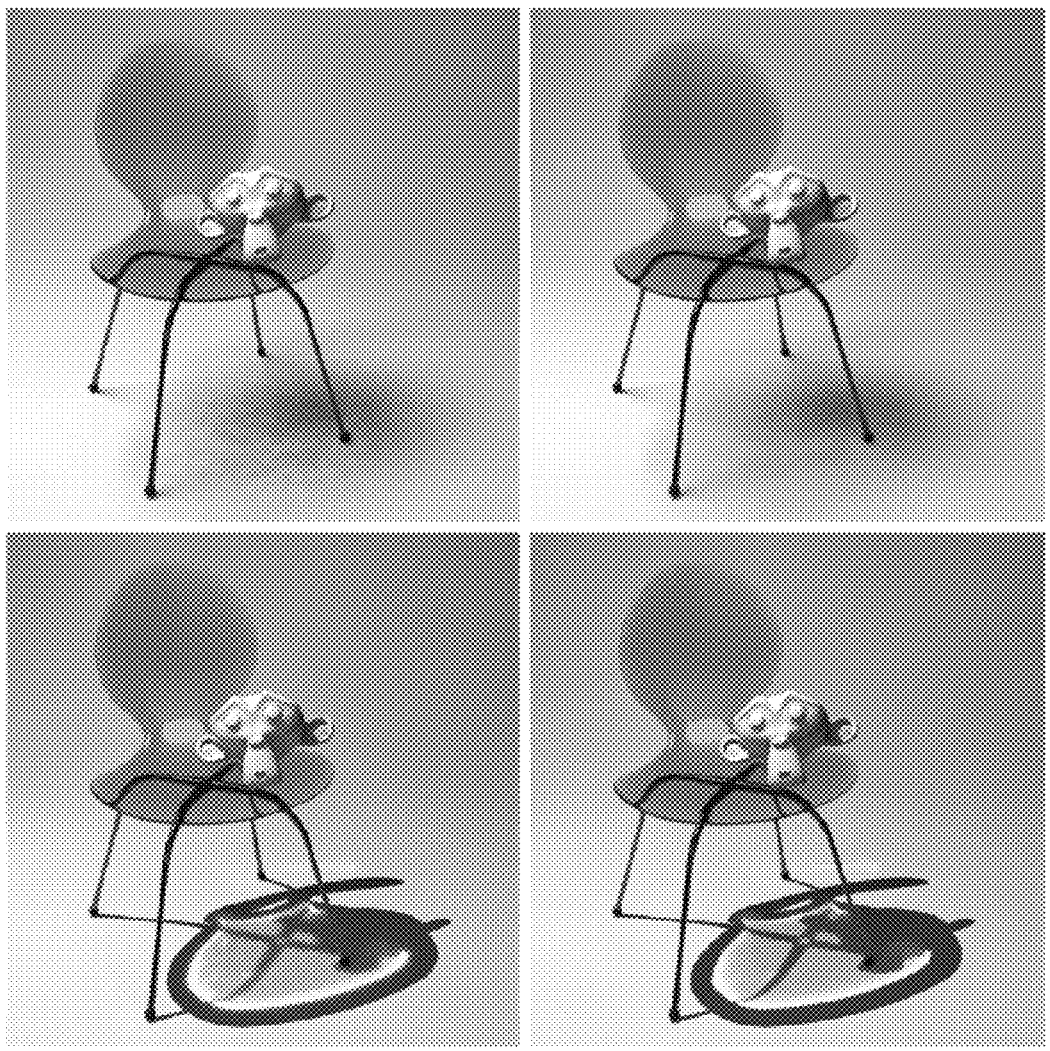

FIG. 7 shows caustics from light passing through a transparent plastic chair. The frames in this figure correspond to those in FIG. 6. Unrelaxed photon maps are rendered with 200 photons in the radiance estimate. Using our method, photons are relaxed by 20 iterations and rendered with 20 in the radiance estimate.

Figure 8:
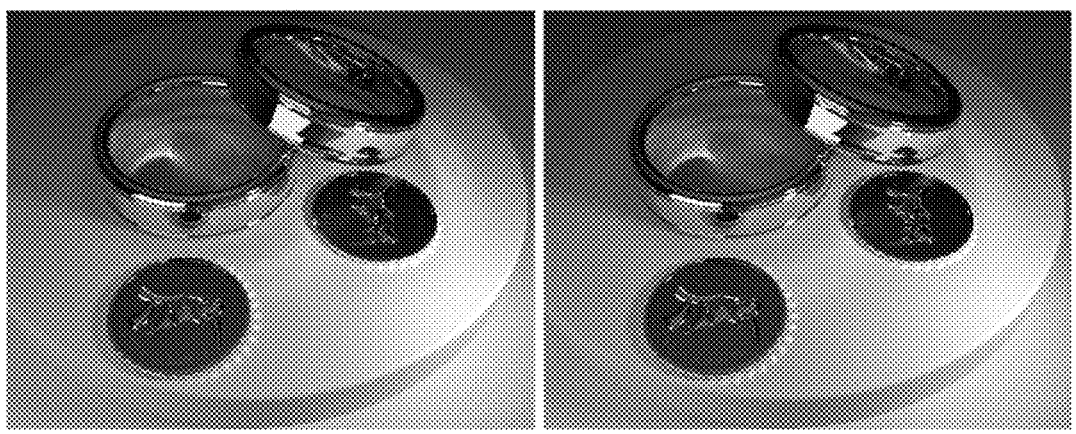

FIG. 8 shows rings and coins. Left frame: Unrelaxed photon map rendered with 350 photons in the radiance estimate. Right frame: Relaxed by 20 iterations and rendered with 20 photons in the radiance estimate.

Figure 9:

FIG. 9 shows a close-up of the coins in FIG. 8. Left frame: Relaxed by 20 iterations; 20 photons in the radiance estimate. Middle frame: Unrelaxed; 350 photons in the radiance estimate. Right frame: Unrelaxed; 20 photons in the radiance estimate.

Figure 10:
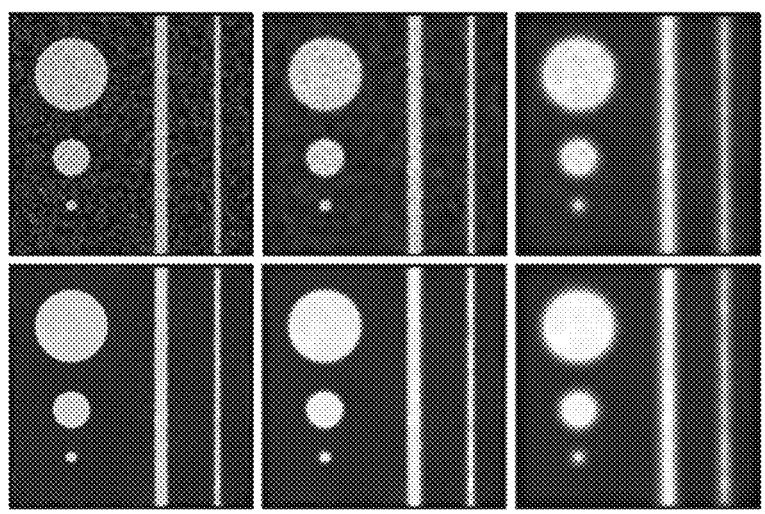

FIG. 10 shows bias and noise tests. Top row: unrelaxed photon map. Bottom row: relaxed by 20 iterations. Columns from left to right: 10, 50 and 250 photons in the radiance estimate respectively.

Figure 11:
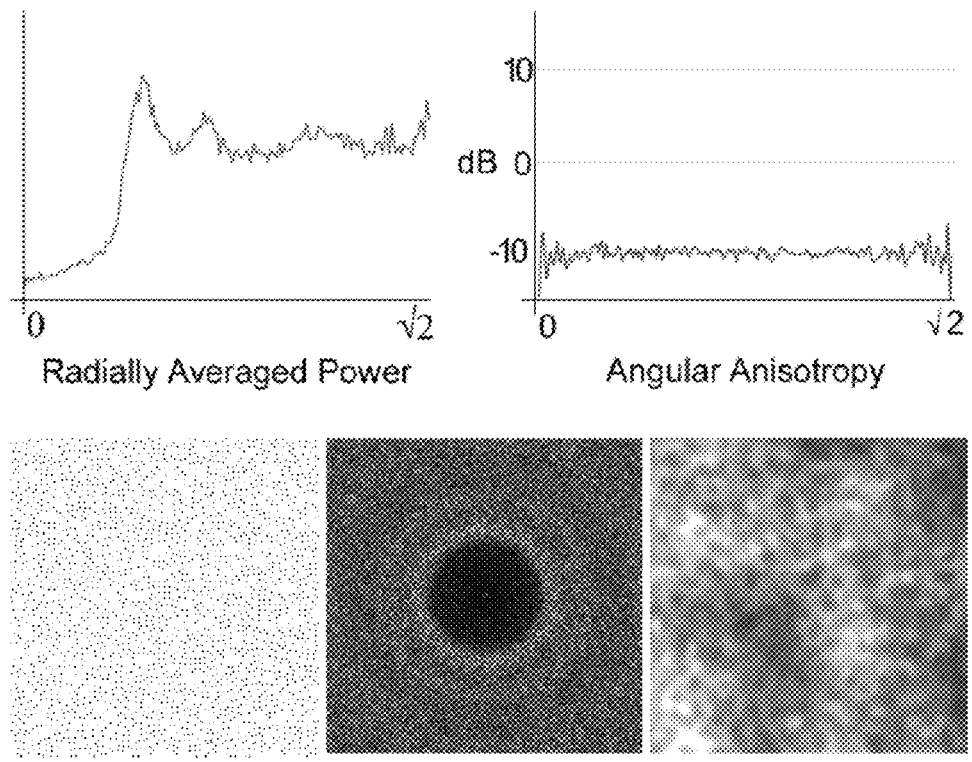

FIG. 11 shows on top left and right: The radial power spectrum and angular anisotropy of an initially random distribution of photons after 50 relaxation iterations. Over-relaxation is disabled. Bottom left: The relaxed point distribution. Bottom centre: The Fourier transform of the previous frame. Note the blue noise spectral signature. Bottom right: A render of the photon map with high gamma correction to highlight noise.

Figure 12:
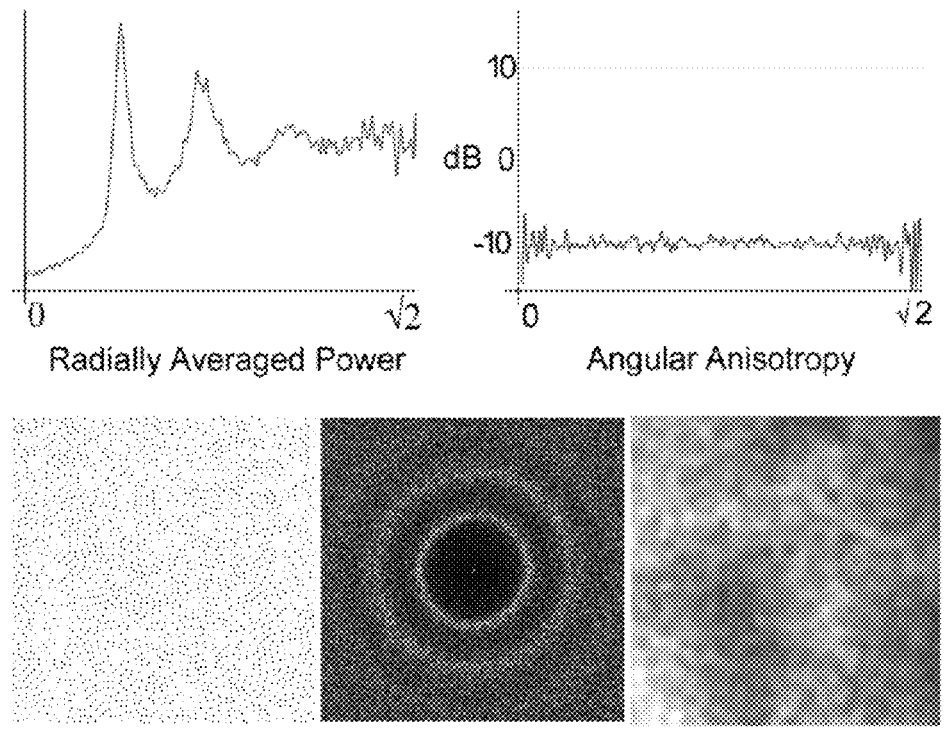

FIG. 12 is as FIG. 11 except with the over-relaxation parameters $\lambda_{max}$ and $\lambda_{min}$ set to 2.0 and 1.2 respectively. Note the resulting cellular patterns in the photon distribution and the slightly reduced variance in the final render.

In the introduction, some of the prior research carried out into bias and noise reduction in photon density estimation has been reviewed. It is also described how a good primal photon distribution cannot always guarantee a low-discrepancy sequence on intersecting geometry. In the following, a new approach based upon photon redistribution, according to an exemplary embodiment of the present invention, is described. By performing an additional pass after photon tracing, the aim is to redistribute photons into an arrangement with a blue noise spectral signature. This approach can be broken down into two distinct steps:

Systematically search through the photon map for features and discontinuities, storing the inferred information in the photon data structure;

Iteratively relax each photon according to a repulsion vector derived from the k-nearest neighbours. The data obtained during the previous step can be used to constrain point migration and preserve important details.

3.1. Relaxation

In order to redistribute photons over the surface of intersecting geometry we employ a point repulsion method similar to that described in [Tur91]. This approach is simple and intuitive and does not require a Voronoi tessellation of the sample distribution.

For a given photon p at point $\vec{x}$, we calculate the force of repulsion $\vec{f}$ as being the weighted sum of the offset k-nearest neighbours:

$$\vec{f} = \frac{1}{K} \sum_{k=1}^{K} (\vec{x} - \vec{x}_k)\left(\frac{r\tau(i)}{d_k + \varepsilon} - 1\right) \tag{1}$$

Here, $d_k$, represents the distance from $x_k$ to x, ϵ is an arbitrarily small constant. We choose a value of K=6 given that points relaxed using Lloyd's method naturally converge to a hexagonal lattice-like distribution with 6 adjacent neighbours per point, r represents the radius of the disc enclosing the K+1 neighbouring photons. This is necessary to prevent the $K^{th}$ photon always lying on the periphery of the disc and thus having zero weight. τ(i) amplifies the value of r and hence the magnitude of $\vec{f}$. We call this the over-relaxation coefficient and define it as:

$$\tau(i) = \lambda_{min} + (\lambda_{max} - \lambda_{min})\exp\left(-\frac{6i^2}{I^2}\right) \tag{2}$$

Where $\lambda_{max}$ and $\lambda_{min}$ represent the higher and lower relaxation bounds, blended together by a Gaussian falloff. Here, i is the current relaxation iteration and I the total number of iterations (see section 5.2 for more detailed discussion on the effects of varying λ).

One of the most notable advantages of photon mapping is its paradigm of decoupling irradiance from geometry. While there are established methods of tracking particle migration over surfaces [Tur92], it is simpler and more versatile to keep our algorithm geometry-independent. This can be achieved by projecting $\vec{f}$ into the plane tangent to the surface at x. We derive an orthonormal basis from the surface normal $\vec{n}$ and using it to define the new, projected vector, $\vec{f}'$:

$$\vec{u} = \vec{n} \times (-n_{x_1} n_{y_3} - n_z)$$

$$\vec{v} = \vec{n} \times \vec{u}$$

$$\vec{f}' = \vec{u}(\vec{u} \cdot \vec{f}) + \vec{v}(\vec{v} \cdot \vec{f}) \quad (3)$$

We apply the relaxation step to each photon in succession, computing the repulsion vector $\vec{f}'$ then adding it to the position of the photon.

We find that the number of relaxation steps required to remove all-frequency noise from a sample distribution depends on the method used to cast photons. Purely random point distributions exhibit noise across the entire spectrum of spatial frequencies. In this case, 30 or more relaxation steps may be required to satisfactorily remove all objectionable noise. Conversely, quasi-random distributions confine noise to higher frequencies. In these instances we find that 20 relaxation steps are usually sufficient (see section 4 for examples).

Point repulsion can be effectively expressed as a diffusion operation. The direction of migration is a function of the derived gradient of photon density meaning particles naturally flow from more dense to less dense regions. In exchange for removing objectionable noise from the sample distribution, photon relaxation introduces a systematic error that we call diffusion bias. This results in blurring and loss of high frequency detail and is especially apparent along edges and discontinuities.

Figure 2:
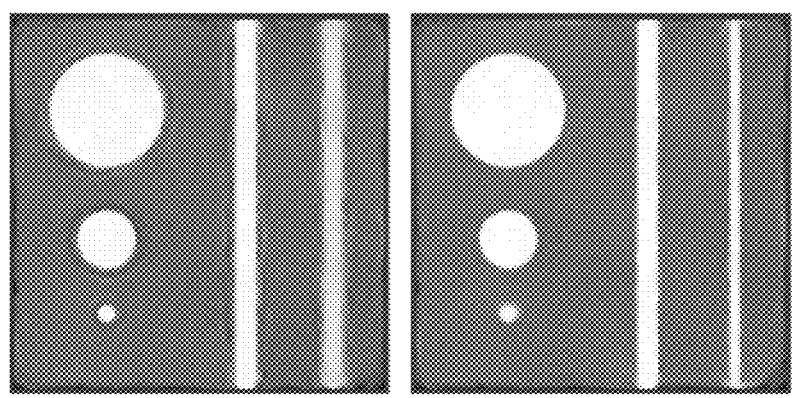

To solve this problem it is necessary to acquire data on the structure of the photon map and use it to constrain movement relative to an axis perpendicular to the irradiance gradient. Schjøth et al [SOS06] use this approach to define a shape-adapting kernel based upon a derived structure tensor. While their solution could be adapted to constrain particle migration, relying purely on the distribution local to each photon does not give us enough precision. FIG. 2 demonstrates the ghosting artefacts that appear when we use a purely gradient-based approach.

To address these problems we introduce a novel method of controlling migration by assigning each photon a constraining vector $\vec{g}$ and a weighting coefficient w. The vector $\vec{g}$ defines an axis which lies in the plane of the photon. The weight w defines the extent to which the repulsive force $\vec{f}'$ is constrained by $\vec{g}$. Thus, a maximally constrained photon with weight 1 can only migrate along $\vec{g}$. An unconstrained photon with weight 0 can move freely it its plane.

In order to find these values we begin by computing the irradiance differential at a given origin $x_o$ from the distribution of the k-nearest neighbouring photons. The vector from $x_o$ to the average photon position defines the gradient vector $\vec{\delta}$. We project this vector into the plane tangent to the surface (using the method described in equation 3) and then normalise it. If a discontinuity passes through the disc containing the k-NN then it is likely that it lies perpendicular to $\vec{\delta}$.

Figure 3:
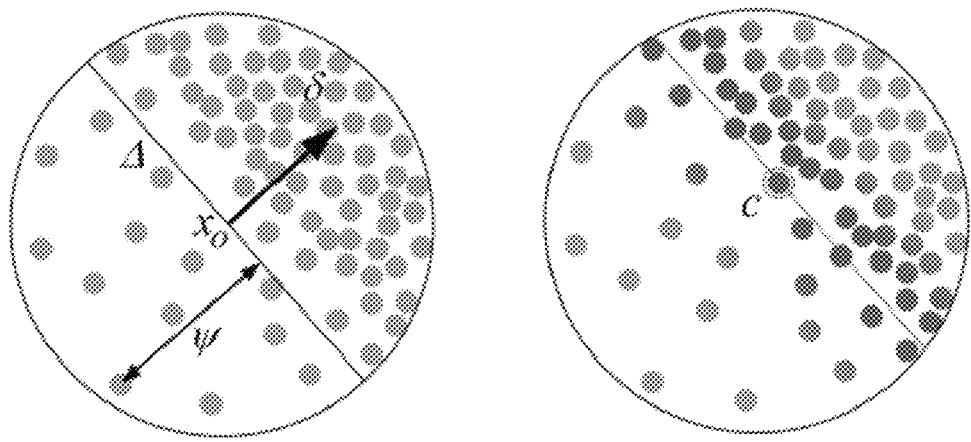
FIG. 3 shows feature detection, (a) The photon gradient δ is calculated and the perpendicular distance Ψ to the plane Δ centred at the origin $x_0$ is calculated for each photon, (b) The heuristic determines the photon c to have the minimum value of χ and hence to be an optimal candidate. Each photon in the estimate is constrained according to its proximity to the gradient plane at c.

We compute the signed distance $\Psi_n$ from each photon n to the plane through the origin lying perpendicular to $\vec{\delta}$ (FIG. 3(a)). The photons are then sorted in ascending order of $\Psi$. Using this information we apply a heuristic, $\chi$, that analyses each neighbour and assesses the uniformity of the distribution lying on each side:

$$\chi = \frac{\sigma_L}{\bar{\psi}_L} + \frac{\sigma_R}{\bar{\psi}_R} \quad (4)$$

The value of σ is derived from the standard deviation of the perpendicular absence between photons. We define it as:

$$\sigma = \sqrt{\frac{1}{N} \sum_{n=1}^{N} (\bar{\psi}_n - \psi_{n-J} - \bar{\psi})^2 \left(1 - \frac{\psi_n^2}{r^2}\right)} \quad (5)$$

The weighting function on the right-hand side of the equation helps to alleviate false positives which may arise from signal noise. $\bar{\Psi}$ is the mean distance, defined as:

$$\bar{\psi} = \frac{1}{N} \sum_{n=1}^{N} (\psi_n - \psi_{n-J}) \quad (6)$$

Here, $\sigma_L$ and $\sigma_R$ are found by applying σ to the two subsets of K that lie to the left and to the right of a given photon, k. These ranges are defined as L=[0,k) and R=(k,K+1]. For the cases of $\Psi_0$ and $\Psi_{K+1}$, the extremes of the gather radius, −r and r, are used respectively.

Our goal is to find the photon to K with the smallest corresponding value of $\chi$, since any discontinuity is most likely to cross this point (FIG. 3(b)). In practise it is not necessary to test all the photons, merely those at discrete intervals along $\vec{\delta}$ equivalent to the mean distance between the photons in the estimate:

$$\bar{\psi}_K \sqrt{\frac{K}{\pi}} .$$

Once a suitable candidate discontinuity has been found we compute a homogeneity metric, l, that represents the ratio between the means of the left and right partitions:

$$\iota(\bar{\psi}_L, \bar{\psi}_R) = \begin{cases} \frac{\min(\bar{\psi}_R, \bar{\psi}_L)}{\max(\bar{\psi}_R, \bar{\psi}_L)} & \text{when } \max(\bar{\psi}_R, \bar{\psi}_L) \neq 0 \\ 1 & \text{otherwise} \end{cases} \quad (7)$$

Figure 4:
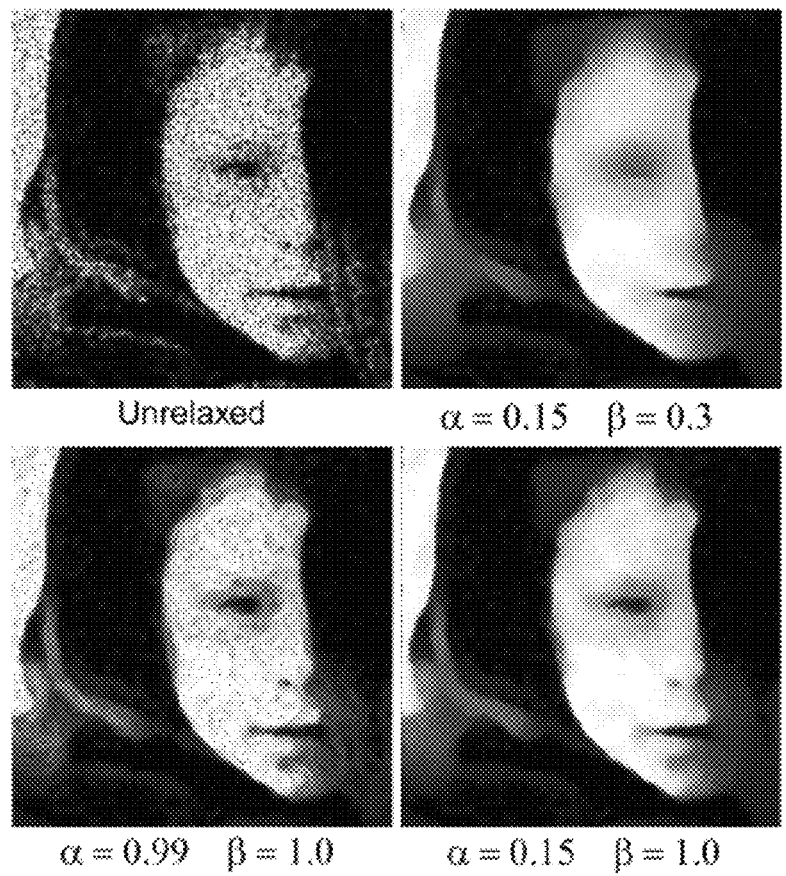
FIG. 4 shows diffusion of a pattern of photons with density proportional to the pixel intensity of an underlying guide image.

The l function returns a value in the range [0,1] where 1 implies an entirely homogeneous distribution and 0 a maximal discontinuity. This value is used to determine the magnitude of the constraint to apply to each photon. We re-map a sub-range of l between the user-specified limits α and β to tune the sensitivity of the heuristic:

$$\iota' = 1 - \frac{i - \alpha}{\beta - \alpha} \text{ where } \alpha < \beta \quad (8)$$

l' is then clamped to the range [0,1]. We found that for scenes containing high-frequency caustics (for example, FIG. 8), a value of α between 0.1 and 0.2 was optimal to highlight discontinuities. Conversely, in scenes containing low-frequency caustics (for example, FIG. 1), and α value of 0.0 was more appropriate. FIG. 4 demonstrates the effects of different values of the two parameters on a sample distribution.

Whenever a photon p is found to lie within the feature gradient (FIG. 3(b)), we update its migration constraints as follows:

$$\vec{g}_p = \vec{g}_p + l'(\vec{\delta} \times \vec{n}_o)$$

$$w_p = \max(w_p, l') \tag{9}$$

Where $n_o$ is the surface normal at the origin $x_o$. We use the maximum of the two values of $w_p$ and l' because the weight of multiple gradients on each photon would most likely not average to 1, permitting unwanted migration acmes edges. Once the entire photon map has been evaluated we normalise all values of $\vec{g}$. For photons where $w_p$ is zero, we derive an arbitrary value of $\vec{g}$ from the surface normal using the first line of equation 3.

Given the normalised constraining vectors and associated weights, we can redefine equation 3 to modify the repulsive force $\vec{f}'_p$:

$$\vec{v}_p = \vec{g}_p \times \vec{n}_p$$

$$\vec{f}''_p = \vec{v}_p(\vec{v}_p(1-w_p) \cdot \vec{f}'_p) + \vec{g}_p(\vec{g}_p \cdot \vec{f}'_p) \tag{10}$$

While the structure preservation heuristic outline in the previous section is effective at constraining photons which lie on important features, the cost of applying the heuristic at every photon is relatively high. One of the benefits of iteratively sweeping through the k-nearest neighbours is that the heuristic can locate the most likely feature edge candidate regardless of where it lies in the local neighbourhood. Therefore, we need only ensure that every photon is captured and analysed at most once during feature detection. Choosing an optimum bandwidth for feature searching depends on the density and distribution of the photon map. We found that a value of K=150 worked well in all our examples.

The most effective way of preventing unnecessary gradient searches is to mark photons captured within each estimate radios as "touched". Covering the map involves moving sequentially along a list of pointers to each of the photons. If a given photon is untouched, it is chosen as the center of a region to be searched. Otherwise, it is skipped. This approach effectively excludes photons that have already been swept and greatly decreases precomputation time. In our implementation we mark all photons within a distance of 0.6 r from $x_o$ as being touched at each search.

Unfortunately, the penalty of minimising the number of feature searches is that holes or weak migration constraints may appear along prominent discontinuities. This occurs when a discontinuity lies at the very edge of the search radius and is disregarded as noise by the heuristic. In addition, faceting artefacts may appear as a result of a straight gradient vector being used to constrain a curved edge. To address these problems we perform additional searches on photons lying along identified feature gradients (FIG. 3(b)). This means that once a feature of discontinuity is detected, the local neighbourhood is explored laterally across the distribution gradient, further identifying and reinforcing it.

In section 3.2 we showed how the feature detection and migration constraints are effective at preserving sharp edges. However, blurring and loss of fidelity may still occur due to photon migration across steep gradients that do not necessarily qualify as discontinuities. FIG. 5 (centre) demonstrates the effect of excessive diffusion on fine details.

To compensate, we introduce another constraint which applies a Gaussian falloff to the magnitude of each repulsion vector $\vec{f}''_p$:

$$\vec{f}'''_p = \vec{f}''_p \exp\left(-\left(\frac{\|\vec{f}''_p\|}{r_p}\right)^2 \frac{-\ln(0.5)}{\rho^2}\right) \tag{11}$$

The net effect is that the motions of photons with high migration pressure are damped while those with a low pressure are free to move. This results in the effective diffusion of low-frequency noise while still preserving higher-frequency details. In equation 11, $\rho$ is a scaling parameter that controls the extent of the constraint. In all our examples, we set this parameter to 0.3. We found that using the value of $r_p$ buffered from the previous relaxation iteration prevented unwanted artefacts being introduced into the distribution.

One of the drawbacks of using very compact kernel sizes is the potential for noise to appear as a result of variance in chromaticity and intensity between photons. This may occur when caustics from two different coloured emitters mix or when a spectrally-based photon model is used (see [Wal98] for an example). We can address this problem by applying a diffusion operation to the flux of the photons at each relaxation step.

Given a photon p, its new flux $\Phi'_p$ can be calculated as the weighted mean of itself and k-nearest adjacent neighbours, $$\Phi'_p = \frac{\Phi_p + \sum_{k=1}^{K} \Phi_k W(k)}{1 + \sum_{k=1}^{K} W(k)} \tag{12}$$

Where W(k) is an Epanechnikov kernel weighting function. Note that the migration constraining vectors of the photon k are used to prevent flux diffusion across discontinuities:

$$W(k) = \left(1 \ldots \frac{d_k^2}{r^2}\right)(w_k \|\vec{g}_k(\vec{x}_p - \vec{x}_k)\| + (1 - w_k)) \tag{13}$$

To test the efficacy of our algorithm we compare images of various scenes rendered using photon relaxation and standard k-NN, static bandwidth photon mapping. In all cases we use an isotropic kernel with an Epanechnikov weighted filter. In addition, photons are cast from quad area light sources. Sampling over the domain of (u, v, θ, φ) is achieved using a low-discrepancy Halton sequence using the first 4 primes with a Faure permutation [Fau92] applied to improve the distribution. This method effectively reduces very low-frequency noise negating the need for high numbers of relaxation iterations. All images rendered with our technique use 20 photons in the radiance estimate unless otherwise stated. Below this threshold we find that kernel artefacts (which are typically negligible at larger bandwidths) begin to appear.

All the images in our examples (including test patterns) provides experimental validation of their techniques with are tone mapped using the operator outlined by Reinhard et al [RSSF02]. We apply our relaxation technique to photon maps from scenes containing a mixture of high- and low-frequency caustics generated as a result of both reflection and refraction.

In all examples, $\lambda_{max}=2.0$ and $\lambda_{min}=1.2$. Table 1 provides further detailed statistics for all of the example images.

Figure 1:
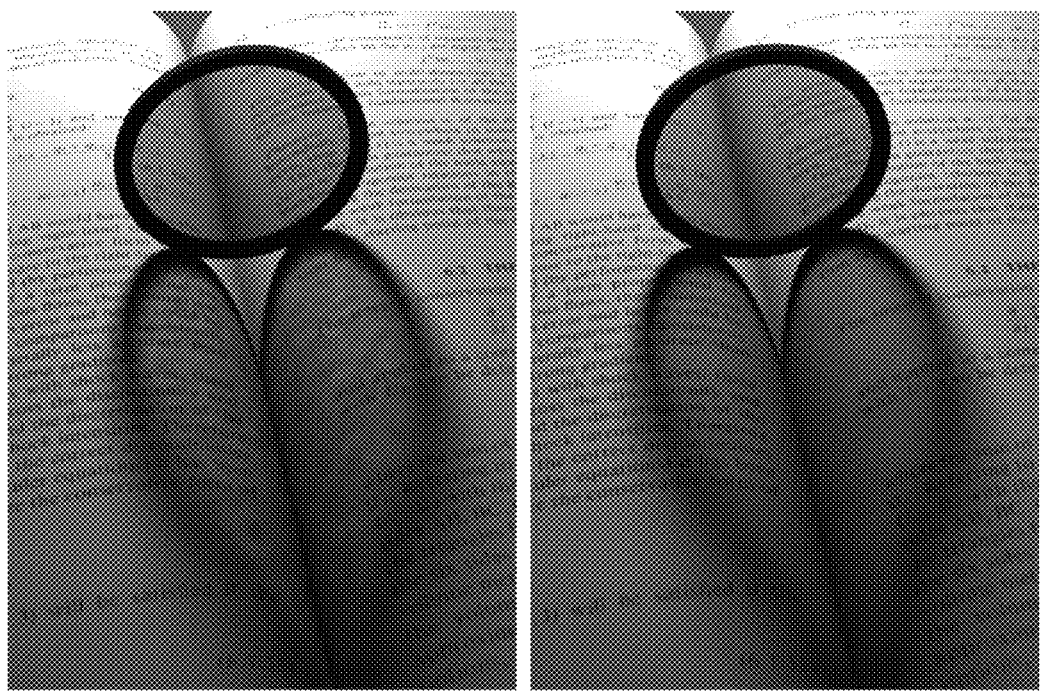

FIG. 1 demonstrates the effectiveness of photon relaxation at removing noise from caustics exhibiting large areas of uniform illumination. Such scenes are typically difficult to render efficiently using existing methods given there is little high-frequency detail to mask the irregularities in the caustic illumination, thus necessitating the use of a large kernel. Notice how all low-frequency noise has been removed using our technique while preserving sharp discontinuities around the shadow penumbra.

FIG. 6 contains a focussed cardioid caustic from an tinted metal ring. This scene highlights the effectiveness of the feature detection algorithm at locating and preserving discontinuities in illumination. Note how the compact kernel size effectively eliminates proximity bias along the bright edges of the caustic.

In FIG. 7, caustics caused by light passing through the thin plastic of the chair are projected onto the ground plane. The fidelity of the diffuse caustics on the underside of the monkey demonstrates how our meshless relaxation approach successfully preserves photon map integrity even on complex geometry. Also note how the detail is preserved around sharp discontinuities while simultaneously removing low-frequency noise in more uniform areas.

FIG. 8 is an example of a scene containing intricate caustics. The edges of the coins create a serrated pattern which is blurred out when a high-bandwidth kernel is applied. Notice how our method successfully identifies edge details which are correctly preserved and enhanced during the relaxation step.

Table 1 provides statistics for photon map pre-processing and render time speed-up. One of the most prominent advantages demonstrated by these data is the decreased render time due to fewer photons being required during density estimation. We also analyse the effectiveness of our approach when compared to existing methods and demonstrate the blue noise properties of the photon distribution by means of Fourier decomposition.

Previous literature on the subject of bias and noise reduction the use of photon test patterns. In particular, Schjøth et al [SOS06] use a purely random distribution of 50,000 photons superimposed with an ellipse and two vertical bars at a density 10 times that of the background. The flux of each photon is a constant. The authors present this pattern in order to demonstrate the edge-preserving qualities of their algorithm. In FIG. 10 we reproduce their examples to demonstrate and compare the effectiveness of our relaxation-based approach.

To demonstrate the blue noise properties of the relaxed photon sample distribution we apply a discrete Fourier transform to a $256^2$ pixel sample region with an absolute point density of 5%. From these data we derive the radially-averaged power spectrum and angular anisotropy. In all tests we use the measured anisotropy of white noise (0.26) as a baseline of −10 dB (see [Uli88]).

FIG. 11 shows analytical data obtained from a random point distribution after 50 relaxation steps. In this example over-relaxation is disabled (by setting both $\lambda_{min}$ and $\lambda_{max}$ to 1.0). After a sufficient number of iterations this configuration will eventually yield an ideal, hexagonal lattice-like distribution. Unfortunately, the time required to reach this state is prohibitive. We found that by increasing $\lambda_{min}$ to a value of 1.2 and $\lambda_{max}$ to 2.0, the photons relax into a configuration with distinct cellular patterns similar to those in [Tur91]. Significantly, the resulting distribution exhibits a blue noise spectral signature with stronger oscultations and a corresponding lower render variance similar to that of the ideal state obtained when over-relaxation is disabled. Analytical data obtained using these parameters can be found in FIG. 12.

It should be noted that the present invention is not restricted to the above-described embodiment and preferred embodiments may vary within the scope of the appended claims. The term "comprising", when used in the specification including the claims, is intended to specify the presence of stated features, means, steps or components, but does not exclude the presence or addition of one or more other features, means, steps, components or groups thereof. Furthermore, the word "a" or "an" preceding an element in a claim does not exclude the presence of a plurality of such elements. Moreover, any reference sign does not limit the scope of the claims. The invention can be implemented by means of both hardware and software, and several "means" may be represented by the same item of hardware. Finally, the features of the invention, which features appear alone or in combination, can also be combined or separated so that a large number of variations and applications of the invention can be readily envisaged.

REFERENCES

[Col94] COLLINS S.: Adaptive splatting for specular to diffuse light transport. In *Proceedings of the 5th Eurographics Workshop on Rendering* (1994), pp. 119-135.

[Coo86] COOK R. L.: Stochastic sampling in computer graphics. *ACM Transactions on Graphics* 3, 1 (1986), 51-72.

TABLE 1

Render statistics. Note that render time μ represents the speed-up in calculation of illumination from the caustic component only. Std. and Rlx. represent values as applicable to the standard method and our relaxed method respectively.

|  | Red Filter | Coins | Chair (point) | Chair (area) | Ring (point) | Ring (area) |
|---|---|---|---|---|---|---|
| Image Resolution | 480 × 640 | 840 × 525 | 600 × 600 | 600 × 600 | 600 × 478 | 600 × 478 |
| Polygons | 13,002 | 126,797 | 26,570 | 26,570 | 6,062 | 6,062 |
| Photons | 58,000 | 433,000 | 74,000 | 73,000 | 60,000 | 56,000 |
| Render time μ | 5.09 | 10.05 | 6.25 | 5.5 | 5.54 | 4.86 |
| Feature search t | 1.26 s | 10.78 s | 4.24 s | 2.8 s | 2.67 s | 1.74 s |
| Relaxation t | 6.67 s | 47.01 s | 12.99 s | 12.33 s | 5.83 s | 5.42 s |
| Iterations | 20 | 20 | 20 | 20 | 20 | 20 |
| [α, β] | [0, 0.35] | [0.2, 0.35] | [0.2, 0.35] | [0, 0.35] | [0.2, 0.35] | [0, 0.35] |

|  | Std. | Rlx. | Std. | Rlx. | Std. | Rlx. | Std. | Rlx. | Std. | Rlx. | Std. | Rlx. |
|---|---|---|---|---|---|---|---|---|---|---|---|---|
| Radiance estimate | 200 | 20 | 350 | 20 | 200 | 20 | 200 | 20 | 100 | 20 | 100 | 20 |

[DW85] Dippe M. A. Z., Wold E. H.: Antialiasing through stochastic sampling. In *SIGGRAPH '85: Proceedings of the 12th annual conference on Computer graphics and interactive techniques* (1985), ACM, pp. 69-78.

[Fau92] Faure H.: Good permutations for extreme discrepancy. In *J. Number Theory* (1992), vol. 42, pp. 47-56.

[HP02] Hey H., Purgathofer W.: Advanced radiance estimation for photon map global illumination. vol. 21, pp. 541-545.

[Ige99] Igehy H.: Tracing my differentials. In *SIGGRAPH '99: Proceeding of the 26th annual conference on computer graphics and interactive techniques* (1999). ACM Preso/Addison-Wesley Publishing Co., pp. 179-186.

[JB02] Jensen H. W., Buhler J.: A rapid hierarchical rendering technique for transplacement materials. In *ACM Transactions on Graphics* (2002), vol. 21, ACM, pp. 576-581.

[JC95] Jensen H. W., Christensen N. J.: Photon maps in bidirectional Monte Carlo ray tracing of complex objects. In *Computers and Graphics* (1995), vol. 19, pp. 215-224.

[Jen96c] Jensen H. W.: Global illumination using photon maps. In *Proceedings of the Eurographics workshop on Rendering techniques '96* (1996). Springer-Verlag, pp. 21-30.

[Jen96b] Jensen H. W.: *The Photon Map in Global Illumination-PhD Thesis*. Technical University of Denmark, Lyngby, 1996.

[XCODL06] Koff J., Cohen-Oe D., Deussen O., Lischinski D.: Recursive Wang files for real-time blue noise. *ACM Transactions on Graphics* 25, 3 (2006), 509-518.

[Kel95] Keller A.: A quasi-Monte Carlo algorithm for the global illumination in the radiosity setting. In *Monte Carlo and Quasi-Monte Carlo Methods in Scientific Computing* (1995), Springer, pp. 239-251.

[Llo83] Llloyd S. A.: An optimization approach to relaxation labeling algorithms. *Image and Vision Computing* 1, 2 (May 1983), 85-91.

[MF92] McCool M., Fiume E.: Hierarchical Poisson disk sampling distributions. In *Proceedings of the conference on Graphics interface '92* (1992), Morgan Kaufmann Publishers Inc., pp. 94-105.

[Mys97] Myszkowski K.: Lighting reconstruction using fast and adaptive density estimation techniques. In *Proceedings of the Eurographics Workshop on Rendering Techniques '97* (1997), pp. 251-262.

[ODJ04] Ostromoukhov V., Donohue C., Jodoin P.-M.: Fast hierarchical importance sampling with blue noise properties. *ACM Transactions on Graphics* 23, 3 (2004), 488-495.

[RSSP02] Reinhard E., Stark M., Shirley P., Ferwerda J.: photographic tone reproduction for digital images. In *SIGGRAPH '02* (2002), ACM, pp. 267-276.

[Sch03] Schregle R.: Bias compensation for photon maps. *Computer Graphics Forum* 22, 4 (2003), 29-742.

[SFES07] Schjøth L., Frisvad J. R., Erleben K., Sporrino J.: Photon differentials. In *GRAPHITE '07* (2007), ACM Press, pp. 179-196.

[Shi91] Shirley P.: Discrepancy as a quality measure for sample distributions. In *Computer Graphics Forum: Proceedings of Eurographics '91* (1991), Elsevier Science Publishers, pp. 183-194.

[SJ09] Spencer B., Jones M. W.: Guerarcgucak photon mapping. *IEEE Transactions on Visualization and Computer Graphics* 15, 1 (January-February 2009), 49-61.

[SOS06] Schjøth L., Olsen O. P., Sporring J.; Diffusion based photon mapping. In *International conference on Computer Graphics Theory and Applications* (2006), NSTICC Press, Setubal, Portugal, pp. 158-175.

[SWH+95] Shirley P., Wade B., Hubbard P. M., Zareski D., Walter B., Greenberg D. P.: Global illumination via density estimation. In *Proceedings of 6th Eurographics Workshop on Rendering* (1995), Springer, pp. 219-230.

[Tur91] Turk G.: Generating textures on arbitary surfaces using reaction-diffusion. In *SIGGRAPH '91* (1991), ACM, pp. 289-298.

[Tur92] Turk G.: Re-tiling polygonal surfaces. In *SIGGRAPH '92* (1992), vol. 26, ACM, pp. 35-64.

[UE88] Ulechney R.: Dithering with blue noise. *Proceedings of the IEEE* 76, 1 (January 1988), 56-79.

[Wal98] Walter B.: *Density Estimation Techniques for global Illumination—PhD Thesis*. Cornell University, 1998.

[WHSG97] Walter B. Hubbard P. M., Shirley P., Greenberg D. P.: Global illumination using local line density estimation. *ACM Transactions on Graphics* 16, 3 (1997), 217-259.

The invention claimed is:

1. A method of rendering caustics in a computer graphics scene, the method comprising:
(a) Obtaining a photon map of said scene;
(b) Redistributing photons from said photon map into an arrangement with a blue noise spectral signature by performing a relaxation step in respect of each of a number of photons, whereby for each of the number of photons at point x, a force of repulsion f is calculated as being the weighted sum of the offset k-nearest neighbors;
(c) Determining a constraining vector g for each of the number of photons and a weighting coefficient w for each of the number of photons, wherein the constraining vector g defines an axis in the plane of the photon, and wherein the weighting coefficient w defines the extent to which the repulsion force f is constrained; and
(d) Rendering said scene using the results from step (b) and step (c).

2. A method according to claim 1, wherein k=6, such that relaxation step results in a distribution of points in the form of a hexagonal lattice with 6 adjacent neighbors per point.

3. A method according to claim 2, wherein for each point, a local density is determined based upon the weighted average densities stored at the surrounding k photons, said local density derived from the proximity of the k-nearest neighbors.

4. A method according to claim 1, wherein for each point, a local density is determined based upon the weighted average densities stored at the surrounding k photons, said local density being derived from the proximity of the k-nearest neighbors.

5. A method according to claim 1, wherein said relaxation step includes a diffusion operation applied to the flux of each of said number of photons.

6. A non-transitory computer readable medium storing computer-readable instructions thereon that, when executed by a computer, cause the computer to perform the following procedure:
(a) Obtaining a photon map of said scene;
(b) Redistributing photons from said photon map into an arrangement with a blue noise spectral signature by performing a relaxation step in respect of each of a number of photons, whereby for each of the number of photons at point x, a force of repulsion f is calculated as being the weighted sum of the offset k-nearest neighbors;
(c) Determining a constraining vector g for each of the number of photons and a weighting coefficient w for each of the number of photons, wherein the constraining vector g defines an axis in the plane of the photon, and wherein the weighting coefficient w defines the extent to which the repulsion force f is constrained; and
(d) Rendering said scene using the results from step (b) and step (c).

* * * * *